United States Patent
Malametz

(10) Patent No.: US 7,146,856 B2
(45) Date of Patent: Dec. 12, 2006

(54) DYNAMICALLY BALANCED CAPACITIVE PICK-OFF ACCELEROMETER

(75) Inventor: David L. Malametz, Lynnwood, WA (US)

(73) Assignee: Honeywell International, Inc., Morristown, NJ (US)

( * ) Notice: Subject to any disclaimer, the term of this patent is extended or adjusted under 35 U.S.C. 154(b) by 69 days.

(21) Appl. No.: 10/863,047

(22) Filed: Jun. 7, 2004

(65) Prior Publication Data
US 2005/0268719 A1  Dec. 8, 2005

(51) Int. Cl.
*G01P 15/125* (2006.01)

(52) U.S. Cl. ............... 73/514.32; 73/514.23; 73/514.36

(58) Field of Classification Search ............... 73/514.17–514.18, 514.23, 514.32, 514.36, 73/514.37
See application file for complete search history.

(56) References Cited

U.S. PATENT DOCUMENTS

| | | | |
|---|---|---|---|
| 4,736,629 A * | 4/1988 | Cole ............... | 73/514.32 |
| 4,944,184 A * | 7/1990 | Blake et al. ............ | 73/514.23 |
| 4,945,765 A | 8/1990 | Roszhart | |
| 5,006,487 A * | 4/1991 | Stokes .................... | 438/52 |
| 5,024,089 A * | 6/1991 | Norling ............... | 73/514.23 |
| 5,165,279 A * | 11/1992 | Norling et al. .......... | 73/514.14 |
| 5,900,550 A * | 5/1999 | Menzel .................. | 73/514.32 |
| 6,000,287 A * | 12/1999 | Menzel .................. | 73/514.32 |
| 6,841,992 B1 * | 1/2005 | Yue et al. ............... | 324/162 |

FOREIGN PATENT DOCUMENTS

FR  2694403 A1 *  2/1994

* cited by examiner

*Primary Examiner*—Hezron Williams
*Assistant Examiner*—John C Hanley
(74) *Attorney, Agent, or Firm*—Charles J. Rupnick, Attorney at Law

(57) ABSTRACT

A Micro Electro-Mechanical System (MEMS) acceleration sensing device formed of a silicon substrate having a substantially planar surface; a pendulous sensing element having a substantially planar surface suspended in close proximity to the substrate planar surface; a flexure suspending the sensing element for motion relative to the substrate planar surface, the flexure having a both static geometric centerline and a dynamic centerline that is offset from the static geometric centerline; and a metal electrode positioned on the substrate surface for forming a capacitor with the pendulous sensing element, the metal electrode being positioned as a function of the dynamic centerline of the flexure.

12 Claims, 7 Drawing Sheets

DYNAMICALLY BALANCED CAPACITIVE PICK-OFF ACCELEROMETER

FIELD OF THE INVENTION

The present invention relates to Micro Electro-Mechanical System (MEMS) sensor devices and methods, and in particular to accelerometer sensor devices and methods based on capacitive pick-off and electrostatic rebalance.

BACKGROUND OF THE INVENTION

Sensor devices, including accelerometers, based on capacitive pick-off and electrostatic closed-loop rebalance of out of plane pendulous masses that use single or multiple stacked parallel plates for pick-off are generally well known.

FIGS. 1, 2 and 3 illustrate, in accordance with prior art, a capacitive pick-off sensor constructed as a conventional mid-pendulum hinged or "teeter-totter" type accelerometer having the suspending flexure positioned intermediate the acceleration sensing element, wherein FIG. 1 is an exploded dynamic side view of the sensor, FIG. 2 is a static plan view, and FIG. 3 is a static sectional side view taken along a longitudinal axis L of the accelerometer of FIG. 2. Such devices are constructed using microcircuit techniques to produce reliable, maintenance-free capacitive acceleration-sensing devices. Such a capacitive acceleration sensing device 1, hereinafter a capacitive accelerometer, includes a pair of stationary substrates 2, 3 having opposed parallel planar faces. The substrates 2, 3 are spaced from one another and each has a number of metal electrode layers 4, 5 of predetermined configuration deposited on one surface to form respective capacitor electrodes or "plates." This is an example of multiple stacked plates. The electrode elements 4 (or 5) operate as an excitation electrode to receive stimulating signals, and the other electrode elements 5 (or 4) operate as the feedback electrodes for electrostatic rebalance. A single set of electrode elements 4 (or 5) operates as both excitation and feedback electrodes when the feedback signal is superimposed on the excitation signal.

A pendulous acceleration sensing element 7, commonly referred to as either a "pendulum" or a "proof mass," which operates as pick-off electrode, is flexibly suspended between the substrates 2, 3 by one or more rotational flexures 6 situated at elevated attachment points 8 for pendulous rotation about a fulcrum or hinge axis h to form different sets of capacitors with electrode elements 4, 5. Movement of the acceleration-sensing element, or "pendulum," 7 in response to acceleration changes its position relative to the stationary excitation electrodes 4 (or 5), thereby causing a change in pick-off capacitance. This change in pick-off capacitance is indicative of acceleration. A set of capacitors for electrostatic rebalance is made up of the sensing element 7 and the feedback electrodes 5 (or 4) for driving the sensing element 7 to its reference position balanced between the electrode elements 4, 5 and maintaining it there.

In such an acceleration sensor device, a capacitance formed by the excitation electrodes 4 (or 5) and the moveable sensing element 7 is related to 1/D, where D is the offset between electrodes 4, 5 and the pendulous acceleration sensing element 7 when constructed or emplaced relative to the substrates 2, 3 on the elevated attachment points 8.

FIGS. 4, 5 illustrate another capacitive pick-off sensor 15 constructed in accordance with prior art as a conventional cantilevered sensing element 16 suspended by one or more flexures 17 each constructed as a bending beam, wherein FIG. 4 is a static side view, and FIG. 5 is a dynamic side view of the sensor 15 showing the cantilevered sensing element 16 being deflected to an exaggerated degree. Such a cantilevered capacitive acceleration sensing device 15, hereinafter a capacitive accelerometer, includes at least one, and optionally two, stationary substrates 18 having opposed parallel planar faces. The substrates 18 are spaced from one another and the cantilevered sensing element 16, and each has a number of the metal electrode layers 4, 5 of predetermined configuration deposited on one surface to form respective capacitor electrodes or "plates." As described above, the electrode elements 4 (or 5) operate as an excitation electrode to receive stimulating signals, and the other electrode elements 5 (or 4) operate as the feedback electrodes for electrostatic rebalance. A single set of electrode elements 4 (or 5) operates as both excitation and feedback electrodes when the feedback signal is superimposed on the excitation signal. The cantilevered sensing element 16, which operates as pick-off electrode, is flexibly suspended above one substrate 18, or between both substrates 18, at elevated attachment points 19 for pendulous rotation about its fulcrum or hinge axis h to form different sets of capacitors with electrode elements 4, 5. As in the teeter-totter type acceleration sensor device 1, the fulcrum or hinge axis h of the cantilevered sensing element 16 is assumed to coincide with the centerline of the flexure 17.

As in the sensor 1 of FIGS. 1, 2 and 3, movement of the acceleration-sensing element, or "pendulum," 16 in response to acceleration changes its position relative to the stationary excitation electrodes 4 (or 5), thereby causing a change in pick-off capacitance. This change in pick-off capacitance is indicative of acceleration. A set of capacitors for electrostatic rebalance is made up of the sensing element 16 and the feedback electrodes 5 (or 4) for driving the sensing element 16 to its reference position balanced between the electrode elements 4, 5 and maintaining it there.

As in the teeter-totter type acceleration sensor device, a capacitance formed by the excitation electrodes 4 (or 5) and the moveable sensing element 16 is related to 1/D, where D is the offset between electrodes 4, 5 and the pendulous acceleration sensing element 16 when constructed or emplaced relative to the one or more substrates 18 on the elevated attachment points 19.

A desirable characteristic of an accelerometer is a linear response for pick-off capacitance C versus acceleration input g. However, conventional high-g range teeter-totter and cantilevered type accelerometers have less than optimum linearity for high performance application and may also have a non-monotonic response for electrostatic rebalance force versus acceleration when feedback voltage is capped. The capacitance seen by the pick-off electrodes is related to the integral of 1/d(i) for each a(i) over the area of the excitation electrodes, where d(i) is the dynamic separation distance between the stationary electrodes and the pendulum for each incremental area a(i). The sensor's dynamic range, scale factor and response linearity are thus defined by the separation distance D (shown in FIG. 1) between the stationary electrode elements 4, 5 and the respective pendulous acceleration-sensing element 7, 16, and the lateral offset of electrode elements 4, 5 relative to the respective attachment points 8, 19. In both conventional teeter-totter and cantilevered type acceleration sensor devices, the stationary capacitor electrodes 4, 5 are traditionally arranged substantially along a longitudinal axis of symmetry L of the respective acceleration sensing device 1, 15 perpendicular to the fulcrum or hinge axis h of flexures 6, 17 suspending the respective acceleration-sensing elements 7, 16, as illustrated in FIGS. 1, 4. Electrode elements 4, 5 are sized and spaced in symmetrically with respect to the longitudinal axis L of the respective acceleration sensing device 1, 15. Furthermore, the electrode elements 4 (or 5) are further sized and spaced symmetrically with respect to the fulcrum or hinge axis h of the respective moveable sensing element 7, 16, which is assumed to lie along a geometric centerline Cg of the respective flexure 6, 17.

Conventional teeter-totter type acceleration sensor devices of the type illustrated in FIG. 1 and cantilevered type acceleration sensor devices of the type illustrated in FIG. 4, have been fabricated from a body of semiconductor material, such as silicon, as Micro Electro-Mechanical Systems, or "MEMS," integrated micro devices or systems combining electrical and mechanical components fabricated using integrated circuit (IC) batch processing techniques.

In the most general form, MEMS consist of mechanical microstructures, microsensors, microactuators and electronics integrated in the same environment, i.e., on a silicon chip. MEMS is an enabling technology in the field of solid-state transducers, i.e., sensors and actuators. The MEMS microfabrication technology enables fabrication of large arrays of devices, which individually perform simple tasks but in combination can accomplish complicated functions. Current applications include accelerometers, pressure, chemical and flow sensors, micro-optics, optical scanners, and fluid pumps. For example, one micromachining technique involves masking a body of silicon in a desired pattern, and then deep etching the silicon to remove unmasked portions thereof. The resulting three-dimensional silicon structure functions as a miniature mechanical force sensing device, such as an accelerometer that includes a proof mass suspended by a flexure. Existing techniques for manufacturing these miniature devices are described in U.S. Pat. Nos. 5,006,487, "METHOD OF MAKING AN ELECTROSTATIC SILICON ACCELEROMETER"; and 4,945,765 "SILICON MICROMACHINED ACCELEROMETER"; and co-pending U.S. patent application Ser. No. 10/368,160, "MEMS ENHANCED CAPACITIVE PICK-OFF AND ELECTROSTATIC REBALANCE ELECTRODE PLACEMENT" filed in the names of Aiwu Yue and Ronald B. Leonardson on Feb. 18, 2003, the complete disclosures of all of which are incorporated herein by reference.

High aspect ratio MEMS or "HIMEMS" is one known process for producing such MEMS devices, including MEMS accelerometer devices. HIMEMS permits fabrication of intricate device designs in two dimensions, but requires a fixed device thickness, on the order of a cookie cutter.

Acceleration sensors fabricated using MEMS or HIMEMS technology generally include a moveable sensing element of the type illustrated in FIGS. 1, 4 and indicated respectively by the reference characters 7, 16. In FIGS. 2, 3 the moveable sensing element 7 is attached through attachment points 8 to the lower plate 2 which is a substrate on which the moveable sensing element 7 is manufactured. The lower plate or substrate 3 has formed thereon one set of the metal electrode layers 4, 5.

In FIGS. 4, 5 the moveable sensing element 16 is attached through attachment points 19 to a frame 20 which is a substrate in which the moveable sensing element 16 is manufactured. The lower substrate 18 over which the moveable sensing element 16 is suspended has formed thereon one set of the metal electrode layers 4, 5.

According to the current state of the art for fabricating conventional teeter-totter type acceleration sensor devices using MEMS or HIMEMS technology, each of the attachment points 8 for the one or more flexures 6 is formed as a "mesa" that is elevated relative to the bulk of the substrates 2 (or 3). Using MEMS or HIMEMS technology for fabricating conventional cantilevered type acceleration sensor devices of the type illustrated in FIG. 4 entails forming the one or more flexures 17 by which the acceleration sensing element 16 is suspended from the bulk of the substrate 20. A single etch step or operation thus constructs the respective flexures 6, 17 at attachment points 8, 19 and releases the silicon acceleration sensing elements 7, 16 from the bulk of the respective substrates 2 (or 3) and 20 for operation.

During the single etch step, the remainder of the substrate 2, 3, 18 is simultaneously formed with a substantially planar surface 9, 10 or 21, respectively, spaced by the distance D away from the respective acceleration sensing element 7, 16 when emplaced. The etching of the substrates 2, 3 and the frame 20 thus leaves respective attachment points 8, 19 spaced above the substantially planar substrate surfaces 9, 10 and 21. Thus, when emplaced on the elevated attachment points 8, 19, the respective acceleration sensing element 7, 16 is spaced a short distance away from the substrate surfaces 9, 10, 21 so that narrow gaps $g_1$, $g_2$ (best illustrated in FIG. 3), usually on the order of a few microns, for example on the order of 2–4 microns, wherein the acceleration sensing element 7, 16 is free to move during operation are formed between the substrate surface 9 (or 10) and 21 and surfaces of the acceleration sensing element 7, 16 on either side of the elevated attachment points 8, 19.

When intended for operation as a teeter-totter type accelerometer of the type illustrated in FIG. 1, a first portion 11 of the moveable sensing element 7 on one side of the fulcrum or hinge axis h of the flexure 6 is formed with relatively greater mass than a second portion 12 on the other side of the fulcrum or hinge axis h to develop a desired amount of pendulosity. The greater mass of the first portion 11 may be developed by offsetting the flexure 6 relative to the longitudinal dimension of the sensing element 7, as illustrated in FIG. 1, such that a tail portion 13 is provided distal from the flexure 6. In a device 1 fabricated using MEMS or HIMEMS technology, the sensing element 7 is necessarily a substantially two-dimensional object of substantially uniform thickness so that offsetting the flexure 6 causes the longer first portion 11 to have relatively greater mass than the shorter second portion 12 with a center of mass that is spaced relatively further from the fulcrum or hinge axis h of the flexure 6.

When intended for operation as a cantilevered type accelerometer of the type illustrated in FIG. 4, the entire mass of the moveable sensing element 16 suspended about the fulcrum or hinge axis h of the flexure 17 develops the desired pendulosity.

As is well-known in the art, the operating range of an accelerometer of the types illustrated in FIGS. 1 and 4 are physically limited to the acceleration or "g" force that overcomes the ability of the device to electrostatically balance the sensing element 7, 16 relative to the electrode layers 4, 5 and causes the respective teeter-totter and cantilevered type sensing elements 7, 16 to deflect relative to the surfaces 9, 10 and 21 of the respective substrates 2, 3 and 18. When this happens, the excitation and feedback electrodes 4, 5 detect the deflection, as a function of an imbalance in the sensed capacitance, and responsively drive the respective sensing element 7, 16 until it becomes rebalanced relative to the substrate surface 9, 10 and 21.

As discussed herein, obtaining high performance data from accelerometer output that has less than optimum linearity characteristics imposes significant obstacles on micromachined accelerometer designs. With respect to out of plane pendulous mass accelerometers that use stacked parallel plates for pick-off, obtaining linear output has been difficult because the capacitance varies inversely with displacement (1/d). For a teeter-totter type acceleration sensing device 1 of the type illustrated in FIGS. 1, 2, 3, state of the art design and fabrication techniques assume that the fulcrum or hinge axis h of the pendulous acceleration sensing element 7 is coincident with the geometric centerline Cg of the flexures 6. Therefore, state of the art design and fabrication techniques include centering excitation and feedback electrodes 4, 5 about the geometric centerline Cg of the flexures 6 which is one half the flexure length FL, written as FL/2, when the flexure is of a rotational, i.e., teeter-totter, configuration. Thus, according to the state of the art in fabricating conventional mid-pendulum hinged or "teeter-totter" type accelerometers of the type illustrated in FIG. 1, the fulcrum or hinge axis h is assumed to be located at the geometric centerline Cg of the flexure 6, and the effective portions of excitation and feedback electrodes 4, 5 are positioned relative to the geometric centerline Cg of the flexure 6, which is half way between the first and second portions 11, 12 of the moveable sensing element 7 on opposite sides of the assumed fulcrum or hinge axis h.

In other words, the effective portions of first and second electrodes 4, that part of the electrode that is covered by a portion of the sensing element 7, are equidistant from the geometric centerline Cg of the flexure 6 such that the respective center points CL4 of the effective portions of the two electrodes 4 are each spaced an equal distance d4 from the geometric centerline Cg of the flexure 6. Similarly, the effective portions of first and second electrodes 5 are also equidistant from the assumed fulcrum or hinge axis h such that the respective center points CL5 of the effective portions of the two electrodes 5 are each spaced an equal distance d5 from the geometric centerline Cg of the flexure 6. If a single set of electrode elements 4 (or 5) operates as both excitation and feedback electrodes, the electrode elements 4 (or 5) are spaced an equal distance d4 (or d5) from the flexure geometric centerline Cg.

Furthermore, state of the art design and fabrication of conventional mid-pendulum hinged or "teeter-totter" type accelerometer devices 1 assumes that the geometric centerline Cg of the flexure 6 continues to operate as the fulcrum or flexure hinge axis h over the entire operating range of the device 1 such that the fulcrum or hinge axis h is assumed to remain at the flexure geometric centerline Cg throughout the range of deflection of the sensing element 7 until it becomes rebalanced relative to the substrate surface 9, 10. In other words, conventional design and fabrication techniques for mid-pendulum hinged type accelerometers assume that the flexure length FL, as measured parallel to a neutral axis n of the relaxed and undeflected flexure 6, remains constant over the entire dynamic operating range of the device 1 so that the position of the geometric centerline Cg of the flexure 6 relative to the electrode elements 4, 5 remains the same when deflected.

According to the state of the art in fabricating conventional bending beam or cantilever-hinged pendulum type accelerometers, of the type illustrated in FIG. 4, the effective portions of excitation and feedback electrodes 4, 5 are positioned relative to the geometric centerline Cg of the flexure 17, which is half way between the flexure attachment point 19 to the frame 20 and a distal end 22 of the flexure 17 where it attaches to the pendulous acceleration sensing element 16. In other words, the effective portions of the electrodes 4, 5 are positioned as a function of the geometric centerline Cg of the flexure 17 such that the effective portions of electrodes 4, 5 are spaced respective distances d4, d5 from the geometric centerline Cg of the flexure 17.

Furthermore, state of the art techniques for design and fabrication for bending beam or cantilever-hinged pendulum type accelerometers also assume that the position of the geometric centerline Cg flexure 17 remains constant relative to the electrode elements 4, 5 throughout the range of deflection of the sensing element 16 until it becomes rebalanced relative to the substrate surface 21. In other words, the flexure geometric centerline Cg of the relaxed or undeflected flexure 17 relative to the electrode elements 4, 5 is assumed to remain the same when the sensing element 16 is deflected.

SUMMARY OF THE INVENTION

The present invention overcomes limitations of the prior art by reducing nonlinearity effect causes which is highly desirable in capacitive-sensing MEMs accelerometers. This reduction in non-linearity effect causes results in more accurate device mathematical models and corresponding coefficients without significantly increasing the level of modeling beyond a simple second order equation.

The present invention is a device and method that place capacitive sensing pads as a function of a flexure dynamic centerline, which improves nonlinearity effect in the accelerometer's output. The present invention thus accounts for shifts of the centerline of the hinge, or fulcrum, over an operational g-range of both cantilevered beam-hinge and rotational hinge or "teeter-totter" accelerometers. That is, as a g-load is applied and the proof mass deflects, the flexure is deflected. Proof mass interaction with the sense and drive electrode pads depends only on the resulting position of the proof mass relative to the electrode pads, not the shape of the flexure. When the proof mass is rotated, i.e., deflected, differential capacitance between the sensing pads is measured. This differential is based on the initial position of the proof mass relative to the sensing pads. The present invention determines the position of the proof mass relative to the sensing pads as a function of the input g-range of the device to position the capacitive electrode pads relative to the proof mass. The present invention thus places at least the capacitive sensing pads relative to the dynamic centerline of the suspension flexure, which improves the nonlinearity of the device output. The present invention is applicable to both cantilevered beam-hinge and rotational hinge or "teeter-totter" accelerometers.

According to one aspect of the invention, the present invention is embodied in a Micro Electro-Mechanical System (MEMS) sensor device formed of a silicon substrate having a substantially planar surface; a pendulous sensing element having a substantially planar surface suspended in close proximity to the substrate planar surface; a flexure suspending the sensing element for motion relative to the substrate planar surface, the flexure having a both static geometric centerline and a dynamic centerline that is offset from the static geometric centerline; and a metal electrode positioned on the substrate surface for forming a capacitor with the pendulous sensing element, the metal electrode being positioned as a function of the dynamic centerline of the flexure.

According to another aspect of the invention, the dynamic centerline of the flexure is offset from the static geometric centerline as a function of a deflection of the pendulous sensing element relative to the substrate surface. The deflection of the pendulous sensing element may be determined as a function of an operational g-force input of the sensor. According to another aspect of the invention, the deflection of the pendulous sensing element is less than a maximum deflection caused by subjecting the sensing element to a maximum operational g-force of the sensor device.

According to another aspect of the invention, the flexure suspending the sensing element is positioned intermediate the sensing element, whereby the sensor device is embodied as a capacitive pick-off sensor of the mid-pendulum hinged or "teeter-totter" type.

According to another aspect of the invention, the sensing element is cantilevered relative to the substrate surface by the flexure, whereby the sensor device is embodied as a capacitive pick-off sensor of the bending beam type.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

Figure 1:
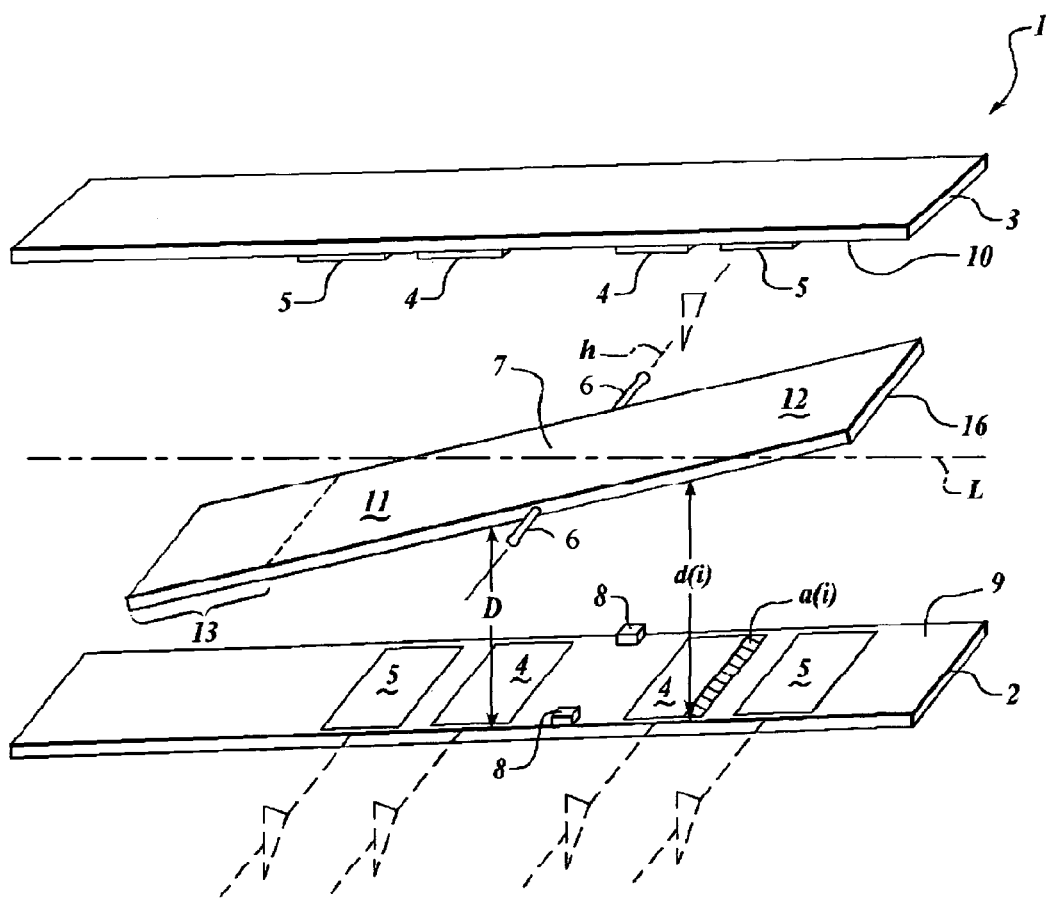
FIG. 1 is an exploded dynamic side view of a capacitive acceleration sensing device of the prior art that illustrates a typical mid-pendulum hinged or "teeter-totter" type accelerometer.
Figures 2, 3:
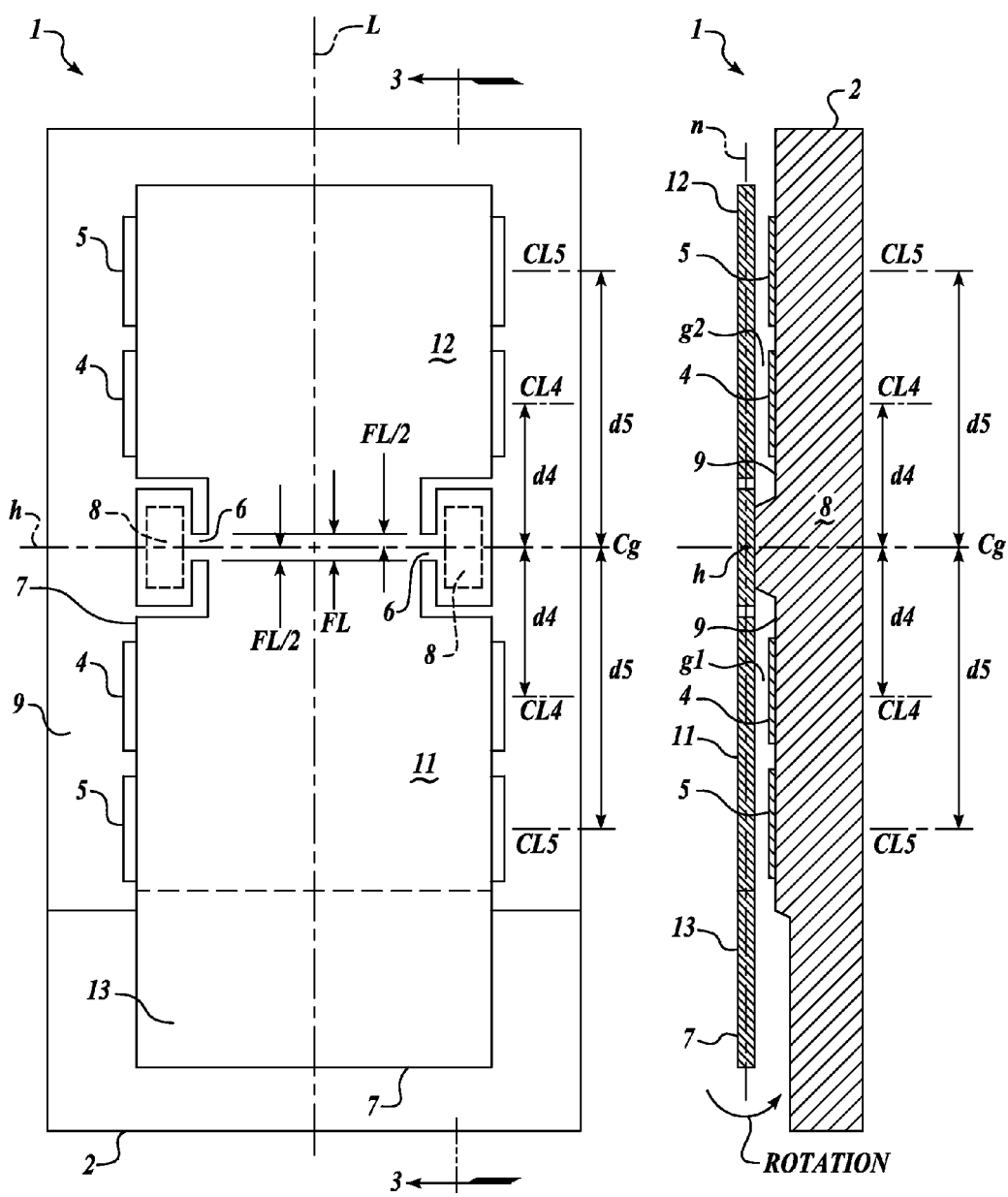
FIG. 2 is a static plan view of the mid-pendulum hinged type accelerometer illustrated in FIG. 1.
FIG. 3 is a static sectional side view taken along a longitudinal axis of the accelerometer illustrated in FIG. 2.

In the Figures, like numerals indicate like elements.

The present invention embodied as a capacitive acceleration-sensing device of either the mid-pendulum hinged or "teeter-totter" type or the cantilevered "bending beam" type both fabricated using known Micro-Electro-Mechanical System (MEMS) or High aspect ratio MEMS (HIMEMS) technology and having effective portions of one or more excitation and feedback electrodes positioned relative to a pendulous acceleration sensing element as a function of a fulcrum or hinge axis h that is located at a dynamic centerline $C_d$ of a flexure from which the acceleration sensing element is pendulously suspended, where the dynamic centerline $C_d$ is at the center of an effective bending portion of the deflected flexure as measured relative to an undeflected neutral axis n of the flexure. The dynamic centerline $C_d$ is shifted relative to the geometric centerline $C_g$ of the relaxed or undeflected flexure.

Accordingly, as illustrated in the Figures and described in detail herein, the invention is embodied as an apparatus and method for providing a capacitive acceleration-sensing device of the mid-pendulum hinged "teeter-totter" type or cantilevered bending beam type having one or more metal electrode layers positioned on a substantially planar reference surface relative to a movable acceleration sensing element to form respective capacitor electrodes or "plates" when the movable acceleration sensing element is structured to operate as a capacitive pick-off electrode that is pendulously suspended by one or more flexures, each of the one or more flexures being aligned along a neutral axis n that is substantially parallel with the planar reference surface when the flexure is in a relaxed and undeflected state and each of the one or more flexures includes both a first fixed end that is coupled to the reference surface and a second free and movable end that is distal from the first fixed end and is coupled to the movable acceleration sensing element, and an effective bending portion that lies between the first fixed end and the second free end, the effective bending portion having an effective relaxed and undeflected or straight length as measured when the flexure is in its neutral relaxed state and aligned substantially parallel with the planar reference surface having the metal electrode layers. The effective bending portion of the flexure has a second deflected length that is measured parallel to the undeflected or straight neutral axis n of the relaxed flexure when the acceleration sensing element is deflected toward or away from the planar reference surface. Furthermore, the fulcrum or hinge axis h of the flexure is located at a dynamic centerline $C_d$ the effective bending portion of the flexure.

The one or more metal electrode layers are positioned as a function of the dynamic centerline $C_d$ of the effective bending portion of the flexure as determined when the flexure is deflected toward or away from the planar reference surface. The dynamic centerline $C_d$ of the effective bending portion of the flexure is shifted along a longitudinal axis L of the device relative to the geometric centerline $C_g$ of the relaxed and undeflected flexure.

According to one embodiment of the present invention, the dynamic centerline $C_d$ of the flexure is optionally determined as a function of the intended operational g-range of the device. Accordingly, the dynamic centerline $C_d$ of the effective bending portion of the flexure is determined when the flexure is deflected toward or away from the planar reference surface to a degree consistent with a selected load or operational "g" force to be applied to the movable acceleration sensing element during operation.

According to one embodiment of the invention, the dynamic centerline $C_d$ of the effective bending portion of the flexure is determined when the flexure is deflected toward or away from the planar reference surface to a degree consistent with a selected load or operational g-force that is less than a maximum g-force to be applied to the movable acceleration sensing element during operation.

Figures 6, 7:
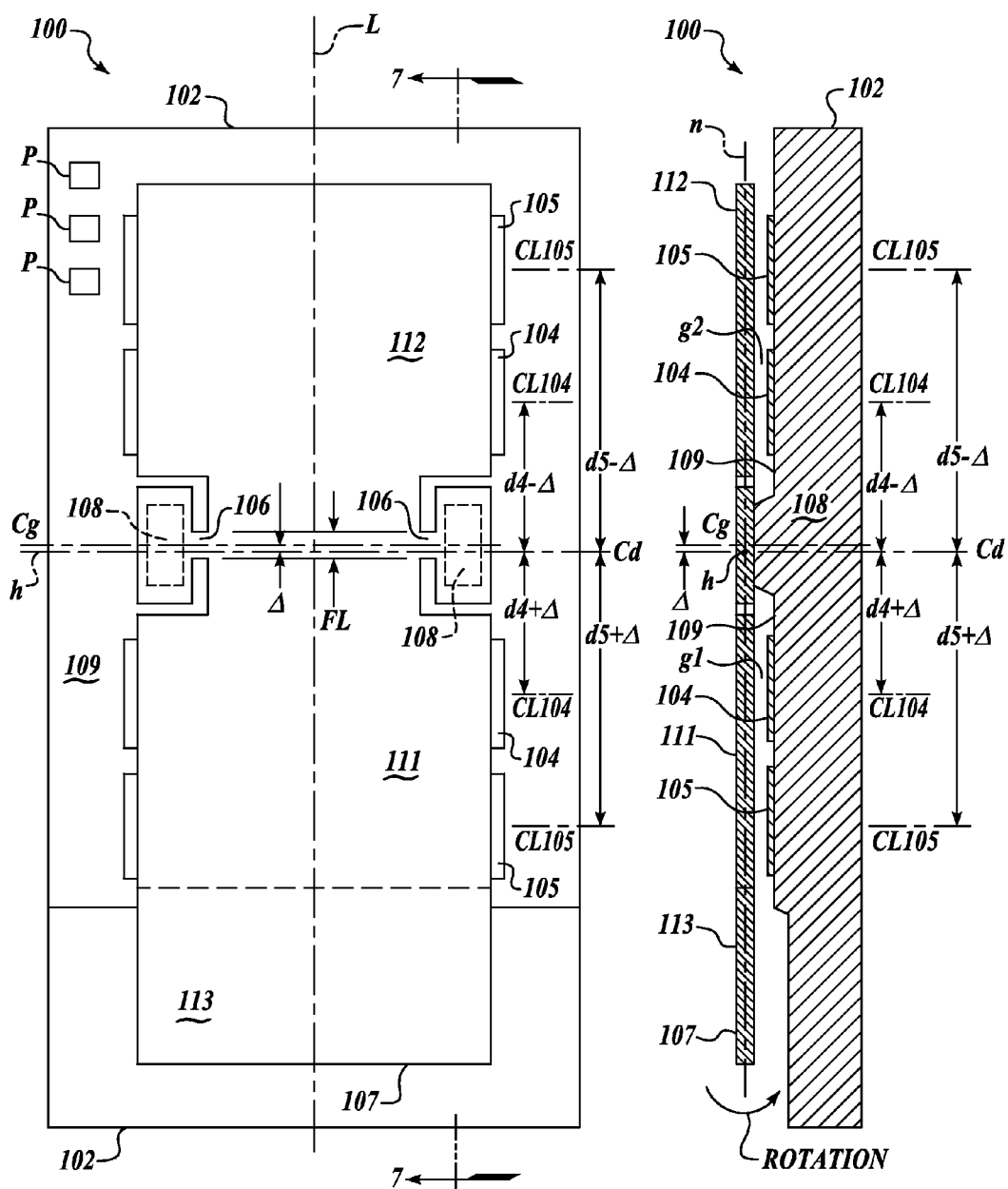
FIG. 6 is a plan view that illustrates the present invention embodied as a capacitive acceleration-sensing device of the mid-pendulum hinged "teeter-totter" type.
FIG. 7 is a side section view of the static mid-pendulum hinged "teeter-totter" type capacitive acceleration-sensing device of FIG. 6.

FIG. 6 is a plan view that illustrates the present invention embodied as a capacitive acceleration-sensing device 100 of the mid-pendulum hinged "teeter-totter" type fabricated of silicon using known Micro-Electro-Mechanical System (MEMS) or High aspect ratio MEMS (HIMEMS) technology. The device 100 is includes a silicon substrate 102 having a substantially planar reference surface with one or more metal capacitor electrode layers 104, 105 of predetermined configuration deposited thereon to form respective capacitor electrodes or "plates." The electrode elements 104 (or 105) operate as an excitation electrode to receive stimulating signals, and the other electrode elements 105 (or 104) operate as the feedback electrodes for electrostatic rebalance. A single set of electrode elements 104 (or 105) operates as both excitation and feedback electrodes when the feedback signal is superimposed on the excitation signal.

A pendulous acceleration sensing element 107, commonly referred to as either a "pendulum" or a "proof mass," which operates as pick-off electrode, is flexibly suspended substantially parallel to and spaced a short distance away from the substrate 102 by one or more flexures 106 situated at elevated attachment points 108 for pendulous rotation about a fulcrum or hinge axis h to form different sets of capacitors with electrode elements 104, 105. Movement of the acceleration-sensing element 107 in response to acceleration changes its position relative to the stationary excitation electrodes 104 (or 105), moving it closer to or further from the stationary excitation electrodes 104 (or 105) and thereby causing a change in pick-off capacitance. This change in pick-off capacitance is indicative of acceleration. A set of capacitors for electrostatic rebalance is made up of the sensing element 107 and an effective portion of the feedback electrodes 105 (or 104) for driving the sensing element 107 to its reference position balanced between the electrode elements 104, 105 and maintaining it there. As described herein above and further illustrated in FIG. 7, the effective portions of the electrode elements 104, 105 are those portions covered by the acceleration-sensing element 107. The electrode elements or sense pads 104, 105 are formed oversized relative to the acceleration-sensing element 107 to avoid fringing effects.

As illustrated in FIG. 1 and discussed herein above, in such an acceleration sensor device 100, a capacitance formed by the excitation electrodes 104 (or 105) and the moveable sensing element 107 is related to 1/D, where D is the offset between electrodes 104, 105 and the fulcrum or hinge axis h of the pendulous acceleration-sensing element 107 when constructed or emplaced relative to the substrate 102 on the elevated attachment points 108. The sensor's dynamic range, scale factor and response linearity are thus defined by the separation distance D (shown in FIG. 1) between the stationary electrode elements 104, 105 and the flexural fulcrum or hinge axis h of the pendulous acceleration-sensing element 107, and the lateral offset of electrode elements 104, 105 relative to the attachment points 108.

FIG. 6 illustrates the device 100 in a relaxed or unloaded state wherein the pendulous acceleration-sensing element 107 are undeflected and the flexures 106 are unbent, both being substantially parallel to the reference surface, i.e., substantially planar surface 109 of the substrate 102 having the electrode elements 104, 105 formed thereon. The flexures 106 are situated at elevated attachment points 108 for pendulous rotation of the acceleration sensing element 107 about a fulcrum or hinge axis h located at the dynamic centerline Cd of the flexure 106 that is shifted along the device longitudinal axis L relative to the flexure geometric centerline Cg by a difference $\Delta$ (delta). The electrode elements 104, 105 are positioned on the surface 109 of the substrate 102 as a function of the shifted dynamic centerline Cd of the flexure 106. Accordingly, the electrode elements 104, 105 are shifted on the surface 109 of the substrate 102 along the device longitudinal axis L by the difference $\Delta$ (delta) by which the flexure dynamic centerline Cd is offset from the geometric centerline Cg.

According to one embodiment of the invention, the difference $\Delta$ (delta) by which the flexure dynamic centerline Cd is offset from the geometric centerline Cg is added to the different distances by which the electrode elements 104, 105 are offset from the geometric centerline Cg of the flexures 106. Accordingly, the difference $\Delta$ (delta) is used to modify the distances d4, d5 by which the centerlines CL104 and CL105 of the respective electrode elements 104, 105 are offset from the geometric centerline Cg of the flexures 106. According to one embodiment of the invention, the difference $\Delta$ (delta) is added to the offset distances d4, d5 to offset the respective electrode elements 104, 105 on one side of the elevated flexure attachment points 108 such that the centerlines CL104 and CL105 of the respective electrode elements 104, 105 are offset from the flexure geometric centerline Cg by respective distances d4+$\Delta$ and d5+$\Delta$, while the difference $\Delta$ (delta) is subtracted from the respective offset distances d4, d5 of the electrode element centerlines CL104 and CL105 on the opposite side of the flexure attachment points 108 such that the centerlines CL104 and CL105 of the respective electrode elements 104, 105 are offset from the flexure geometric centerline Cg by respective distances d4-$\Delta$ and d5-$\Delta$.

Accordingly, a first set of the electrode elements 104, 105 forming capacitors with a first portion 111 of the moveable sensing element 107 are offset as a function of the dynamically shifted flexure centerline Cd to a different distance from the geometric centerline Cg of the flexures 106 than a second set the electrode elements 104, 105 forming capacitors with a second portion 112 of the moveable sensing element 107 on the other side of the flexure geometric centerline Cg. According to one embodiment of the invention, the first set of electrode elements 104, 105 operating with the first portion 111 of the moveable sensing element 107 having a tail portion 113 extended therefrom are offset further from the flexure geometric centerline Cg than the second set the electrode elements 104, 105 operating with the second sensing element portion 112.

Furthermore, the amount $\Delta$ (delta) by which the flexure dynamic centerline Cd is offset from the geometric centerline Cg is optionally selected to represent a deflection of the acceleration sensing element 107 relative to the substrate surface 109 and bending of the flexure 106 within an intended operating range of the device 100, between a zero "g" input up to an including a maximum operating range of the device 100 where the acceleration sensing element 107 may be deflected sufficiently to contact the substrate surface 109.

FIG. 7 is a side section view of the static mid-pendulum hinged "teeter-totter" type capacitive acceleration-sensing device 100 in a relaxed or unloaded state that illustrates the offset of the dynamic centerline Cd of the flexure 106 relative to the geometric centerline Cg by the difference $\Delta$ (delta). FIG. 7 furthermore illustrates the positioning of the electrode elements 104, 105 as a function of the offset flexure dynamic centerline Cd, whereby the respective positions of the electrode elements 104, 105 are offset by the difference $\Delta$ (delta) from positions determined as a function of the flexure geometric centerline Cg, as operated by the prior art.

Figure 8:
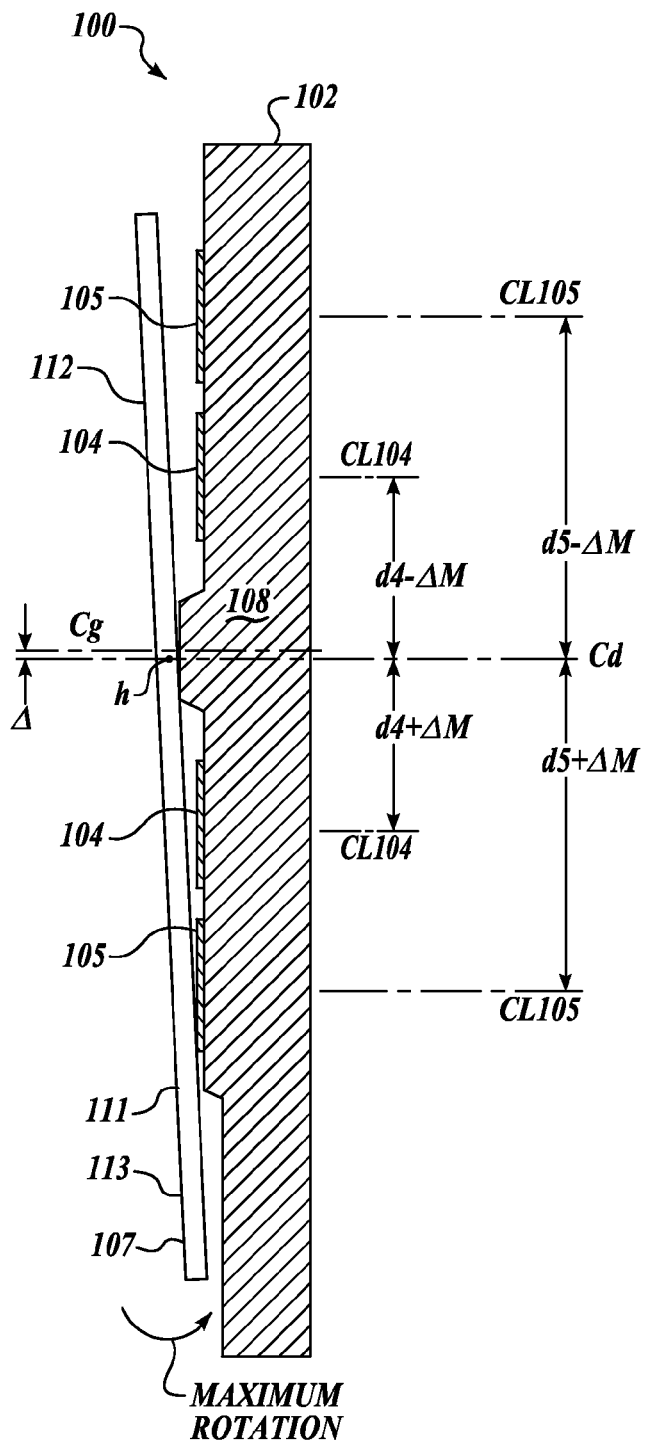
FIG. 8 is a dynamic side view side view of the mid-pendulum hinged "teeter-totter" type capacitive acceleration-sensing device of FIGS. 6 and 7.

FIG. 8 is a dynamic side view side view of the midpendulum hinged "teeter-totter" type capacitive acceleration-sensing device 100 which illustrates the change in relative position of the first and second sets of electrode elements 104, 105 relative to the flexure geometric centerline Cg when the acceleration sensing element 107 is rotated relative to the substrate surface 109 during operation. In FIG. 8 the acceleration sensing element 107 is shown at maximum rotation, i.e., bottomed against the substrate surface 109, as experienced at the maximum operating input of the device 100. Accordingly, the flexure dynamic centerline Cd is offset from the flexure geometric centerline Cg by a maximum difference $\Delta M$, and the respective electrode element centerlines CL104 and CL105 on a first side of the flexure attachment points 108 are offset from the flexure geometric centerline Cg by the maximum difference $\Delta M$ according to: $d4+\Delta M$ and $d5+\Delta M$, respectively, while the respective electrode element centerlines CL104 and CL105 on the opposite side of the flexure attachment points 108 are offset from the flexure geometric centerline Cg according to: $d4-\Delta M$ and $d5-\Delta M$, respectively.

The electrode elements or sense pads 104, 105 are electrically coupled through different electrical connections and traces to a plurality of different wire bond pads P on the surface of the substrate die 102. Well-known drive and sense circuitry is also installed on the substrate die 102 so that the substrate die 102 presents an operational a capacitive acceleration-sensing device having the having dynamically balanced capacitor electrodes of the invention wherein reduced response non-linearity effects result in improved device performance over prior art devices. This improved linear response characteristic results in a more accurate mathematical model of the device's dynamic response and corresponding response curve coefficients without requiring any significantly increase the level of modeling beyond a simple second order equation for describing the dynamic response curve.

The invention is alternatively embodied as an apparatus and method for providing a capacitive acceleration-sensing device of the bending beam or cantilever-hinged pendulum type.

Figure 9:
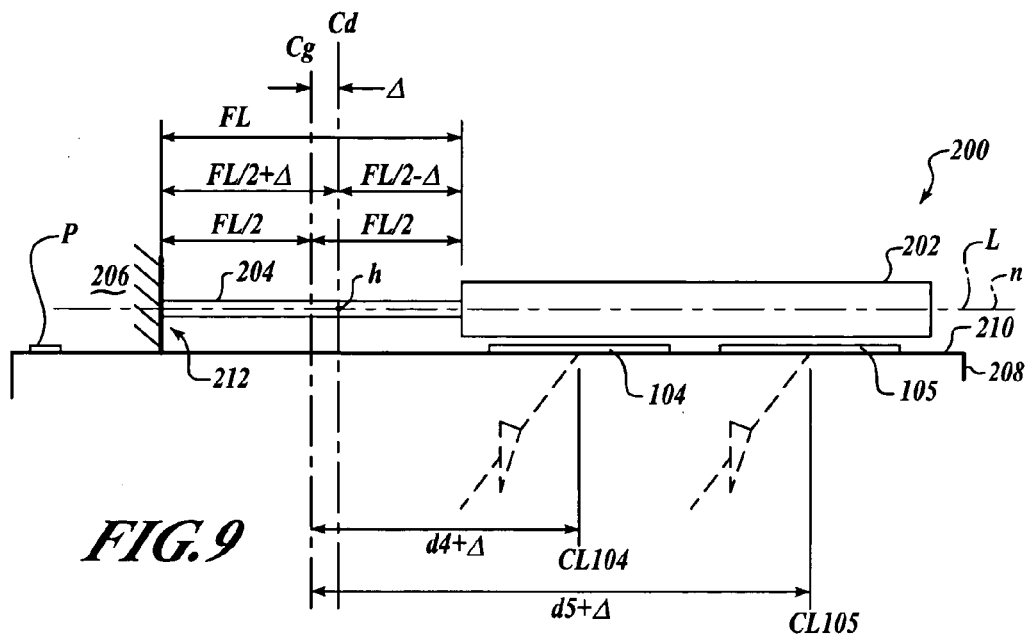
FIG. 9 is a static side view of the invention embodied as a bending beam type device having a cantilevered movable acceleration sensing element.

FIG. 9 is a static side view of the invention embodied as a bending beam type device 200 having a cantilevered movable acceleration sensing element 202 suspended by one or more flexures 204 each constructed as a bending beam. The flexures 204 suspend the cantilevered sensing element 202 from an integral frame 206 and spaced a slight distance away from and substantially parallel with one or more stationary substrates 208 having opposed respective reference surfaces 210 embodied as substantially parallel and planar faces. The substrates 208 are spaced from one another with the cantilevered sensing element 16 between, and each substrate 208 has one or more of the metal electrode layers 104, 105 of predetermined configuration deposited on the surface 210 to form respective excitation and feedback capacitor electrodes or "plates" that operate with the movable sensing element 202 to form one or more capacitors as described herein. The cantilevered sensing element 202, which operates as pick-off electrode, is flexibly suspended above one substrate 208, or between two substrates 208, at elevated attachment points 212 for pendulous rotation about its fulcrum or hinge axis h to form different sets of capacitors with electrode elements 104, 105, as described herein. As in the teeter-totter type acceleration sensor device 100, the fulcrum or hinge axis h of the cantilevered sensing element 202 coincides with a dynamic centerline Cd of the flexure 204 that is shifted along the device longitudinal axis L by a difference $\Delta$ (delta) relative to a geometric centerline Cg of the relaxed or undeflected flexure 204.

According to one embodiment of the invention, the difference $\Delta$ (delta) by which the flexure dynamic centerline Cd is offset from the geometric centerline Cg is added to the different distances by which the electrode elements 104, 105 are offset from the geometric centerline Cg of the flexure 204. Accordingly, the difference $\Delta$ (delta) is used to modify the distances d4, d5 by which the centerlines CL104 and CL105 of the respective electrode elements 104, 105 are offset from the geometric centerline Cg of the flexures 204. According to one embodiment of the invention, the difference $\Delta$ (delta) is added to the offset distances d4, d5 to offset the respective electrode elements 104, 105 such that the centerlines CL104 and CL105 of the respective electrode elements 104, 105 are offset from the flexure geometric centerline Cg by respective distances $d4+\Delta$ and $d5+\Delta$.

Figure 4:
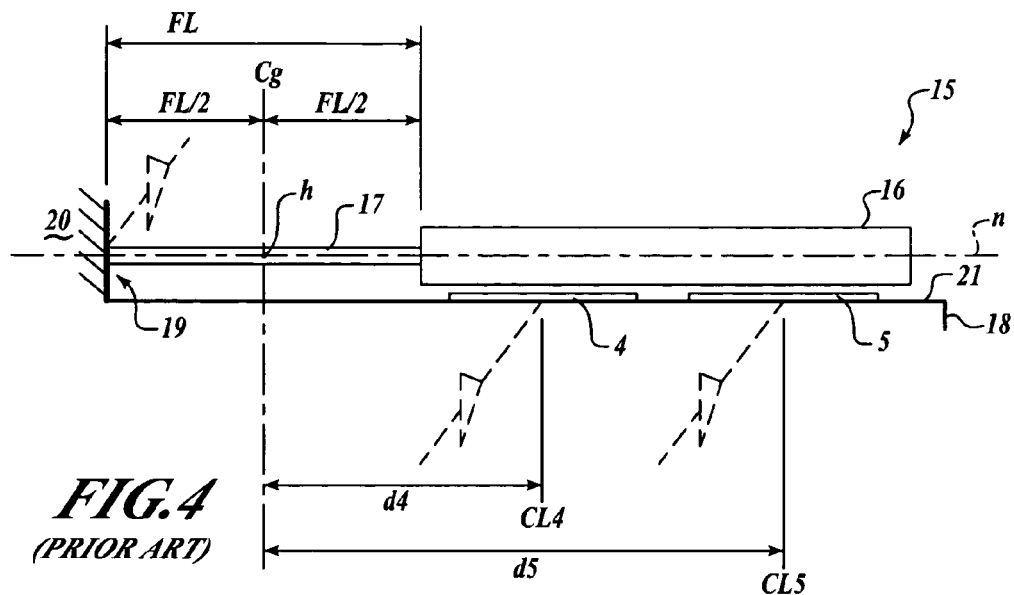
FIG. 4 is a static side view of a capacitive acceleration sensing device of the prior art that illustrates a typical cantilevered sensing element type accelerometer.
Figure 5:
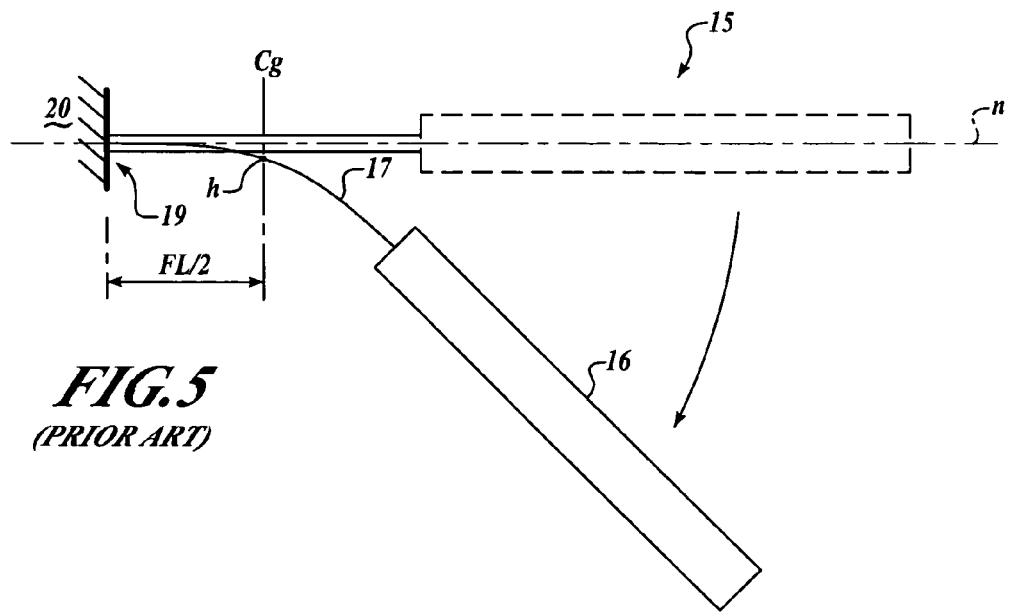
FIG. 5 is an exploded dynamic side view of the accelerometer illustrated in FIG. 4 showing the cantilevered sensing element deflected.

Accordingly, the set of electrode elements 104, 105 forming capacitors with the movable sensing element 202 are offset as a function of the dynamically shifted flexure centerline Cd to a different distance from the geometric centerline Cg of the flexures 204 than a similar set of electrode elements 4, 5 used to form capacitors with the moveable sensing element 17 of prior art devices, as shown in FIG. 4. According to one embodiment of the invention, the set of electrode elements 104, 105 operating with the moveable sensing element 202 are offset further from the flexure geometric centerline Cg than the similar set of electrode elements 4, 5 of the prior art device shown in FIG. 4.

Furthermore, the amount $\Delta$ (delta) by which the flexure dynamic centerline Cd is offset from the geometric centerline Cg is optionally selected to represent a deflection of the acceleration sensing element 202 relative to the substrate surface 210 and bending of the flexure 204 within an intended operating range of the device 200, between a zero g-force input up to an including a maximum operating g-force input range of the device 200 where the acceleration sensing element 202 may be deflected sufficiently to contact the substrate surface 210.

Figure 10:
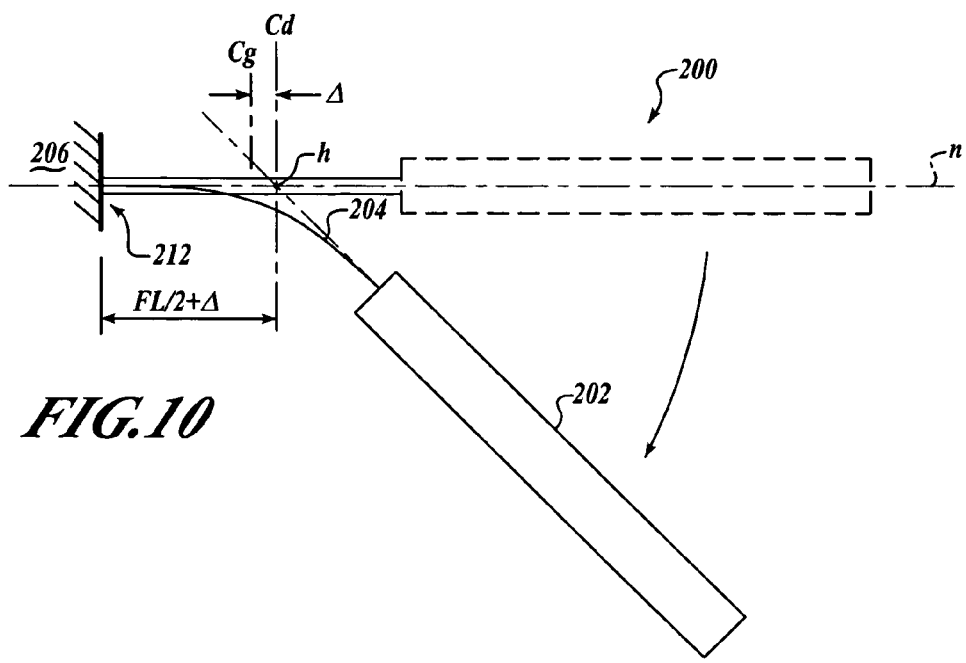
FIG. 10 is a dynamic side view of the bending beam type capacitive acceleration-sensing device of FIG. 9 showing the cantilevered sensing element being deflected to an exaggerated degree.

FIG. 10 is a dynamic side view of the bending beam type capacitive acceleration-sensing device 200 showing the cantilevered sensing element 202 being deflected to an exaggerated degree. FIG. 10 illustrates the offset of the dynamic centerline Cd of the flexure 204 relative to the geometric centerline Cg by the difference $\Delta$ (delta). FIG. 7 furthermore illustrates the positioning of the electrode elements 104, 105 as a function of the offset flexure dynamic centerline Cd, whereby the respective positions of the electrode elements 104, 105 are offset by the difference $\Delta$ (delta) from positions determined as a function of the flexure geometric centerline Cg, as operated by the prior art.

Figure 11:
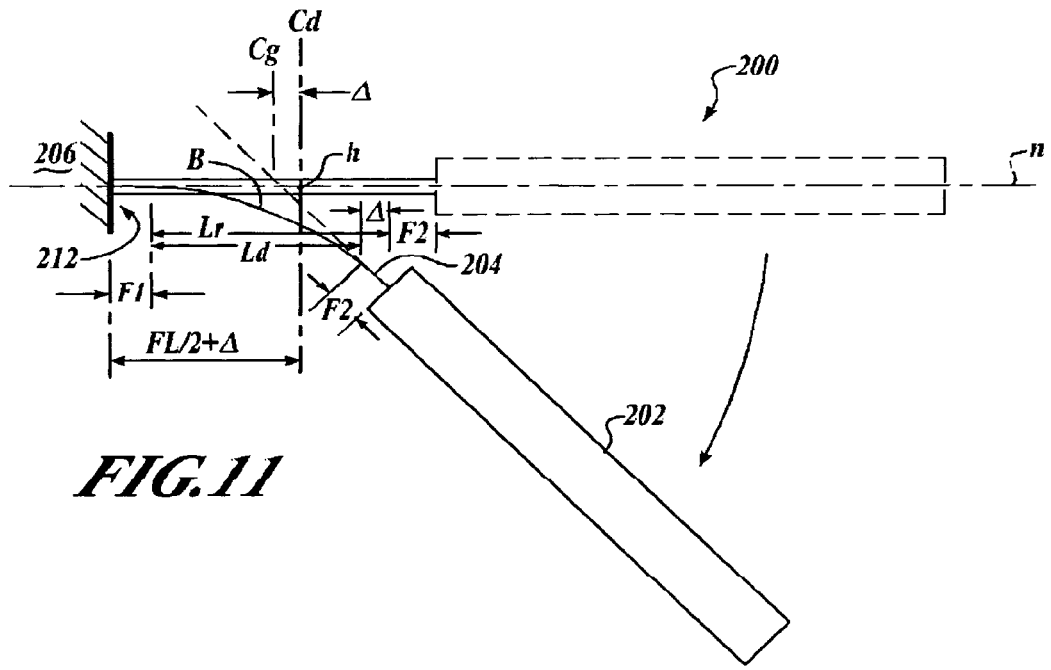
FIG. 11 is another dynamic side view of the bending beam type capacitive acceleration-sensing device of FIG. 9 showing the cantilevered sensing element being deflected to an exaggerated degree.

FIG. 11 is another dynamic side view of the bending beam type capacitive acceleration-sensing device 200 showing the cantilevered sensing element 202 being deflected to an exaggerated degree. According to the invention as illustrated in FIG. 10, each of the flexures 204 includes both a first fixed end F1 that is coupled to the reference surface 210 at attachment points 212 and is rotatable about the fulcrum or hinge axis h and a second free and movable end F2 that is distal from the fulcrum or hinge axis h and is coupled to the movable acceleration sensing element 202, and an effective bending portion B that lies between the first fixed end F1 and the second free end F2, the effective bending portion B having an effective relaxed and undeflected or straight length Lr as measured when the flexure 204 is in its neutral relaxed state and aligned substantially parallel with the planar reference surface having the metal electrode layers 104, 105. The effective bending portion B of the flexure has a second deflected length Ld when the flexure 204 is deflected toward or away from the planar reference surface 210 (shown in FIG. 9), as measured parallel to the undeflected or straight neutral axis n of the relaxed flexure 204, which is parallel with the longitudinal axis L of the device 200. Furthermore, the fulcrum or hinge axis h of the flexure 204 is located at a dynamic centerline Cd the flexure effective bending portion B.

The one or more metal electrode layers 104, 105 are positioned as a function of the dynamic centerline Cd of the effective bending portion B of the flexure 204 as determined when the flexure is deflected toward or away from the planar reference surface 210 (shown in FIG. 9). The dynamic centerline Cd of the effective bending portion B of the flexure 204 is shifted relative to the geometric centerline Cg of the relaxed and undeflected flexure.

According to one embodiment of the present invention, the dynamic centerline Cd of the flexure 204 is optionally determined as a function of the intended operational g-range of the device. Accordingly, the dynamic centerline Cd of the effective bending portion B of the flexure 204 is determined as a function of a deflection of the flexure 204 toward or away from the planar reference surface 210 to a degree consistent with a selected load or operational g-force applied to the movable acceleration sensing element 202. Optionally, the selected load or operational g-force used for determining the deflection of the flexure 204 is less than the maximum operating g-force of the device 200.

Figure 12:
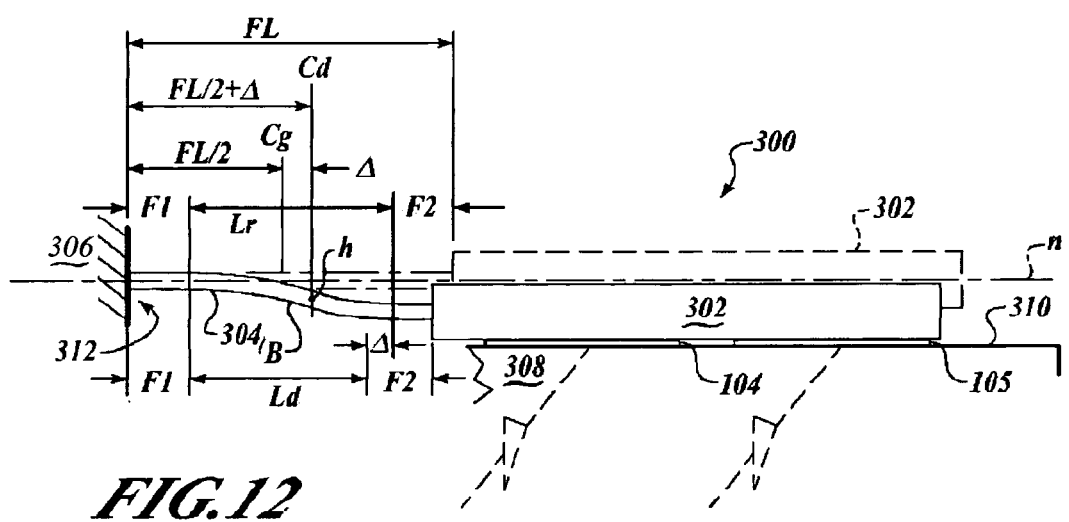
FIG. 12 is a dynamic side view that illustrates the invention embodied as capacitive acceleration-sensing device having a cantilevered movable acceleration sensing element suspended by an "S" bend type bending beam flexure.

FIG. 12 is a dynamic side view that illustrates the invention embodied as capacitive acceleration-sensing device 300 having a cantilevered movable acceleration sensing element 302 suspended by an "S" bend type bending beam flexure 304 from an integral frame 306 and spaced a slight distance away from and substantially parallel with one or more stationary substrates 308 having opposed respective reference surfaces 310 embodied as substantially parallel and planar faces. The substrates 208 are spaced from one another with the cantilevered sensing element 16 between, and each substrate 208 has one or more of the metal electrode layers 104, 105 of predetermined configuration deposited on the surface 210 to form respective excitation and feedback capacitor electrodes or "plates" that operate with the movable sensing element 202 to form one or more capacitors as described herein. The cantilevered sensing element 202, which operates as pick-off electrode, is flexibly suspended above one substrate 208, or between two substrates 208, at elevated attachment points 212 for pendulous rotation about its fulcrum or hinge axis h to form different sets of capacitors with electrode elements 104, 105, as described herein. As in the teeter-totter type acceleration sensor device 100, the fulcrum or hinge axis h of the cantilevered sensing element 302 coincides with a dynamic centerline Cd of the flexure 304 that is shifted along the device longitudinal axis L by a difference Δ (delta) relative to a geometric centerline Cg of the relaxed or undeflected flexure 304.

According to one embodiment of the invention, the difference Δ (delta) by which the flexure dynamic centerline Cd is offset from the geometric centerline Cg is added to the different distances by which the electrode elements 104, 105 are offset from the geometric centerline Cg of the flexure 304. Accordingly, the difference Δ (delta) is used to modify the distances d4, d5 by which the centerlines CL104 and CL105 of the respective electrode elements 104, 105 are offset from the geometric centerline Cg of the flexures 304. According to one embodiment of the invention, the difference Δ (delta) is added to the offset distances d4, d5 to offset the respective electrode elements 104, 105 such that the centerlines CL104 and CL105 of the respective electrode elements 104, 105 are offset from the flexure geometric centerline Cg by respective distances d4+Δ and d5+Δ.

Accordingly, the set of electrode elements 104, 105 forming capacitors with the movable sensing element 302 are offset as a function of the dynamically shifted flexure centerline Cd to a different distance from the geometric centerline Cg of the flexures 304 than a similar set of electrode elements 4, 5 used to form capacitors with the moveable sensing element 17 of prior art devices, as shown in FIG. 4. According to one embodiment of the invention, the set of electrode elements 104, 105 operating with the moveable sensing element 302 are offset further from the flexure geometric centerline Cg than the similar set of electrode elements 4, 5 of the prior art device shown in FIG. 4.

Furthermore, the amount Δ (delta) by which the flexure dynamic centerline Cd is offset from the geometric centerline Cg is optionally selected to represent a deflection of the acceleration sensing element 302 relative to the substrate reference surface 310 and S-bending of the flexure 304 within an intended operating range of the device 300, between a zero g-force input up to an including a maximum operating g-force input range of the device 300 where the acceleration sensing element 302 may be deflected sufficiently to contact the substrate surface 310.

According to the invention embodied as the "S" bend type bending beam flexure capacitive acceleration-sensing device 300 as illustrated in FIG. 10, each of the flexures 304 includes both a first fixed end F1 that is coupled to the reference surface 310 at attachment points 312 and is rotatable about the fulcrum or hinge axis h and a second free and movable end F2 that is distal from the fulcrum or hinge axis h and is coupled to the movable acceleration sensing element 302, and an effective bending portion B that lies between the first fixed end F1 and the second free end F2, the effective bending portion B having an effective relaxed and undeflected or straight length Lr as measured when the flexure 304 is in its neutral relaxed state and aligned substantially parallel with the planar reference surface having the metal electrode layers 104, 105. The effective bending portion B of the flexure has a second deflected length Ld when the flexure 304 is deflected by S-bending toward or away from the planar reference surface 310, as measured parallel to the undeflected or straight neutral axis n of the relaxed flexure 304, which is parallel with the longitudinal axis L of the device 300. Furthermore, the fulcrum or hinge axis h of the S-bend flexure 304 is located at a dynamic centerline Cd the flexure effective bending portion B.

The one or more metal electrode layers 104, 105 are positioned as a function of the dynamic centerline Cd of the effective bending portion B of the flexure 304 as determined when the flexure is deflected by S-bending toward or away from the planar reference surface 310. The dynamic centerline Cd of the effective bending portion B of the flexure 304 is shifted relative to the geometric centerline Cg of the relaxed and undeflected flexure.

According to one embodiment of the present invention, the dynamic centerline Cd of the S-bend flexure 304 is optionally determined as a function of the intended operational g-range of the device. Accordingly, the dynamic centerline Cd of the effective bending portion B of the flexure 304 is determined as a function of a deflection of the flexure 304 toward or away from the planar reference surface 310 to a degree consistent with a selected load or operational g-force applied to the movable acceleration sensing element 302. Optionally, the selected load or operational g-force used for determining the S-bend deflection of the flexure 304 is less than the maximum operating g-force of the device 300.

While the preferred embodiment of the invention has been illustrated and described, it will be appreciated that various changes can be made therein without departing from the spirit and scope of the invention.

What is claimed is:

1. A Micro Electro-Mechanical System (MEMS) sensor device comprising:
a silicon substrate having a substantially planar surface;
a movable sensing element having a substantially planar surface forming first and second sensing portions suspended by a flexure in close proximity to the substrate surface;
the flexure suspending the sensing element for motion relative to the substrate surface about a stationary attachment point, the flexure having a substantially inflexible portion adjacent to the attachment point, and a substantially flexible portion between the inflexible portion and the sensing element where it is attached between the first and second sensing portions of the sensing element, wherein
a static geometric centerline is defined by a geometric axis of the flexure in an undeflected state and a dynamic centerline is defined by a centerline of the flexible portion of the flexure that is offset from the static geometric centerline; and
first and second metal electrodes respectively positioned on the substrate surface on opposite sides of the flexure, a portion of the first and second electrodes forming respective first and second capacitors with the first and second sensing portions of the sensing element, each electrode having a geometric centerline substantially parallel to the geometric centerline of the flexure, wherein the geometric centerlines of the metal electrodes are symmetrically positioned from the dynamic centerline of the flexure.

2. The sensor device of claim 1 wherein the dynamic centerline of the flexible portion of the flexure is determined by the position of the flexible portion with the sensing element deflected from the undeflected state.

3. The sensor device of claim 2 wherein the position of the dynamic centerline is determined when the sensing element is deflected less than a maximum deflection thereof.

4. The sensor device of claim 2 wherein the flexure suspending the sensing element is attached to the sensing element at a position intermediate of the first and second sensing portions of the sensing element.

5. A Micro Electro-Mechanical System (MEMS) capacitive pick-off acceleration sensor device comprising:
a silicon substrate having a substantially planar surface;
a pair of spaced apart attachment points spaced in close proximity above the substrate surface;
a movable sensing element of substantially constant cross-section and having a substantially planar surface suspended adjacent to the attachment points in close proximity to the substrate surface by a pair of flexures;
the pair of flexures being connected to the sensing element between first and second sensing portions thereof and suspending the sensing element from the attachment points for motion relative to the substrate surface, each of the flexures further comprising a substantially inflexible portion adjacent to one of the attachment points and a substantially flexible portion between the inflexible portion and the sensing element, wherein the inflexible portions of the flexures define a geometric centerline thereof, and the flexible portions of the flexures define a dynamic centerline that is spaced away from the geometric centerline when the flexible portions are moved away from the geometric centerline due to movement of the sensing element; and
first and second metal electrodes positioned, respectively, on the surface of the substrate on opposite sides of the flexure, each electrode having a portion thereof forming a capacitor, respectively, with the first and second sensing portions of the movable sensing element, the portions of the first and second metal electrodes forming capacitors each having a geometric centerline substantially parallel to the geometric centerline of the flexures, where the geometric centerlines of the electrode portions are symmetrically spaced from the flexure dynamic centerline.

6. The sensor device of claim 5 wherein the position of the flexure dynamic centerline is determined by the position of the flexible portion of the flexures when the sensing element is deflected from a neutral position.

7. The sensor device of claim 6 wherein the deflection of the sensing element from a neutral position is less than a maximum deflection of the sensing element.

8. The sensor device of claim 6 wherein the deflection of the sensing element from a neutral position comprises a maximum deflection of the sensing element relative to the substrate surface.

9. The sensor device of claim 5 wherein the flexures are attached to the sensing element between a longer and a shorter portion of the sensing element.

10. A sensor device, comprising:
a stationary substrate;
a movable acceleration sensing element spaced away from the stationary substrate and substantially parallel with a surface thereof in a neutral position of the sensing element, the movable sensing element having first and second sensing portions;
a flexure positioned between the first and second sensing portions of the movable acceleration sensing element and suspending the sensing element from a stationary attachment point with respect to the substrate, the flexure having a geometric centerline in the neutral position of the sensing element, and a dynamic centerline offset from the geometric centerline by an offset distance, when the sensing element is moved away from its neutral position;
first and second electrodes respectively positioned on the surface of the substrate on opposite sides of the geometric centerline of the flexure, a portion of each first and second electrode being covered, respectively, by the first and second sensing portions of the sensing element, whereby a plurality of capacitors is formed by the electrodes on the surface of the substrate and the respective sensing portions of the sensing element, and wherein each electrode has a geometric centerline substantially parallel to the geometric centerline of the flexure, the respective first and second covered portions of the electrodes being respectively positioned in an asymmetrical relationship with respect to the geometric centerline of the flexure in which the geometric centerline of one electrode is positioned a distance of twice the offset distance farther from the geometric centerline of the flexure than the geometric centerline of the other electrode.

11. The sensor device of claim 1 wherein the geometric centerline of the flexure is defined when the sensing element is deflected from the neutral position by less than a maximum deflection of the sensing element.

12. The sensor device of claim 1 wherein the sensor device is a capacitive acceleration sensor.

* * * * *